3,789,026
PROCESS FOR THE PRODUCTION OF
REGENERATE
Reinhold Baumann, Hausen, Ernst-Gunter Kunze and Robert Lauerbach-Lehmeier, Frankfurt am Main, Alfred Striebich, Bad Vilbel, and Hans-Joachim Rothe, Offenbach am Main, Germany, assignors to Zimmer Aktiengesellschaft, Frankfurt am Main, Germany
No Drawing. Filed Mar. 22, 1972, Ser. No. 237,174
Claims priority, application Germany, Mar. 24, 1971, P 21 14 304.4
Int. Cl. C08g 53/22, 41/02, 39/00
U.S. Cl. 260—2.3                12 Claims

ABSTRACT OF THE DISCLOSURE

Regenerate produced from "wool," fiber, band and foil waste products from high polymer processes are processed to produce a material suitable for reintroduction into the high polymer process. The regenerate is produced by comminuting the waste and forming a fleece. The fleece is washed and dried and then condensed, preferably with a lubricant. The condensed product, after granulation, may be passed back to the high polymer process.

BACKGROUND OF THE INVENTION

The invention relates to a process for the production of regenerate from waste materials formed during the production of synthetic high polymer thread, fibers and bands. The starting materials for this process are present in the form of a "wool"-like substance, fibers, bands, foils and the like from synthetic high polymers, especially polyesters and polyamides and their copolymers.

In the production of threads, fibers and bands of synthetic high polymers, there arise in the various process stages relatively large amounts of waste threads, fibers and bands, designated herein as waste products. These waste products are not suitable for subsequent processing stages. For example, in initial spinning and stopping, in charge-change, and color change of a spinning installation directly at the spinning nozzle, there are waste products in the form of a wool-like substance often referred to as wool. In the winding, stretching, crimping, texturizing and other processing stages, there likewise result waste products in the form of threads, fibers or bands, which are excluded from further processing at the beginning or termination of bobbin winding as being insufficiently stretched, because of inaccuracy of denier etc. The proportion of waste products in the production of synthetic fiber materials can, to be sure, be reduced to a minimum by exact process conduction and a matured process, but can never be entirely avoided. In any case, the production of waste represents an appreciable cost factor which severely burdens the profitability of a spinning installation. Depending on the particular fabrication conditions, the proportion of the waste products can amount to up to 10% of the total production.

The problem of the waste products from spinning plants acquires a further importance because the threads, fibers, bands, etc. frequently produced as waste have satisfactory to good properties in respect to their chemical composition and have to be removed from the production process only because of their physical form and properties, such as, for example, imprecisions in denier, color deviations, initial spinning losses, etc. Because of the great spatial volume and the incombustibility and non-decomposability of many waste products from the production of synthetic high polymers, there arise further difficulties in their storage, elimination and possible destruction. Frequently, therefore, the practice has taken to collect these waste products at the place they are produced or arise, reducing them by means of suitable presses to a smaller bulk and supplying them at a low price to a further-processing industrial enterprise, which converts the pressed waste products, for example, into injection molding parts, in which damage and chemical decomposition of the reprocessed product are not important or harmless. In part, the waste products are also worked up or converted into a more space-saving form. In this conversion, because of the bulkiness of "wool," fibers, and bands and the like, there is low capacity utilization of the processing devices involved. These devices use means that concentrates the waste products in the presence of water and the concentrated waste is thereupon ground into the desired space-saving form and stored. Depending on the desired purpose of use, a processing method is chosen which yields or produces the worked-up waste product in more or less pure form.

Thus, a process is known by which the waste products from a polyamide process are first freed of unstable fillers or those which would react with the polyamide under treatment conditions, as well as finishes, preparations and sizings which have been applied to the deformed polyamide. It has already been proposed to wash the waste products by means of a suitable washing machine with addition of synthetic fat-dissolvers and dispersing agents, and to dry the thereupon rinsed waste products in a cabinet drier and to cut them up in a fiber-cutting machine to a size less than 35 mm. Further, in the working up of waste products of polyamide there is known a process for concentrating which proposes to moisten the waste product with water, to concentrate it briefly between solid surfaces heated to at least 100° C. and then to break or cut up the resultant waste product into pieces.

The described known processes for the working up of waste products, in each case, involve a definite process stage, which is suited exclusively for the charge-wise processing of a starting machine, for example, polyamide. Frequently there can be processed only waste products which are taken from a certain stage of the production process, so that in each case only a small part of the fibers, threads, bands, and the like excluded in a spinning process can be utilized.

Underlying the present invention, therefore, is the problem of developing a process which avoids the disadvantages mentioned, and processes waste products from diverse starting materials and production stages. These waste products must be entirely worked up, rapidly and gently, into a regenerate which is suited for the production of high-quality products.

SUMMARY OF THE INVENTION

According to the present invention, the problem set forth is solved by a process where the waste products are continuously comminuted, spread out into a fleece and deposited on a continuous conveyance apparatus. The fleece is then washed, squeezed out, loosened up, dried and moistened with a lubricant. The fleece is then mechanically concentrated and, finally, mechanically granulated. The process of the invention makes it possible to work up waste products, especially from the production of synthetic fibers, in a single, continuous working-up process into a valuable regenerate which can be reused for the production of fibers, threads, bands and the like. In the present process it is entirely inconsequential what processing stage the waste product to be worked up had previously been run through. The wool appearing directly at the spinning nozzle is just as well suited for the production of regenerate as the bands or texturized fibers provided with finishes and preparations, since, depending on the requirements, the individual process stages can easily be regulated and adjusted independently of one another with respect, for example, to the temperature, staying time and coating density of the fleece. A further substantial advantage of the invention is that very nearly all known starting materials can be worked up with the aid of the proposed process.

The process of the invention is characterized according to a further embodiment in that the comminution is accomplished by cutting the material to a size beween 1 and 15 mm. with respect to the greatest dimension, and the granulate size is between 0.5 and 10 mm., preferably 2 and 6 mm. The fleece density and the fleece thickness can be optimally adjusted to the particular degree of fouling with the proposed size waste products, without there arising, through the comminution, any harmful proportions of dust-like constituents so that the subsequent washing and drying operating could be disturbed. The proposed granulate size is excellently suited for the reuse of the regenerate and, as is provided, in a further form of execution of the process of the invention, may be returned continuously as regenerate into a main product stream. Through this process, all the waste products taken from the treatment process are immediately worked up and again fed ino the main product stream and thereby contribute in a manner, as simple as it is effective, to an improved economy thereby increasing the profitability of the spinning plant.

For the production of, say, matted or dyed fibers, threads, bands or the like, one embodiment of the process of the invention provides that, with the lubricant, there is added 0.01 to 10% by weight of one or more additives to the waste products, or that as a lubricant there is added from 0.05 to 2.0% by weight of nonyl phenyl phosphite. Through the concentration following upon the moistening with a lubricant, the additives are intimately worked into the waste products, so that the process of the invention can be used at any time for the production of concentrate granulate of waste products. A further proposal for the advantageous execution of the process of the invention is characterized in that the temperature of the washing bath lies between 20 and 90° C., preferably 40–70° C. and the percentage-by-weight constituent of the washing agent amounts to 0.05 to 0.9. The impurities as well as finishes and preparations of the waste products concentrated into the fleece are hereby removed completely and gently. In order to completely preclude any thermal damage and depolymerization, the drying temperature, according to a further proposal of the process of the invention, lies between 100 and 210° C. with a staying time of the fleece in the drying chamber or zone from 2 to 15 minutes. The concentration process takes place advantageously under the action of high sheering forces in a disk compressor with heat removal. The waste products are thereby heated only by the frictional forces occurring and are easily fused and cemented with one another on the surface. If necessary, a proposal of the process of the invention provides that the condensing (concentrating) process takes place under exclusion of oxygen. In this case it is expedient to carry out, for example, a nitrogen blanket or veiling or thereby to counteract any possible yellowing of the product worked up according to the process of the invention.

EXAMPLES

With the aid of the following illustrative but non-limiting examples, the invention is further explained in detail.

Example 1

A wool of endless polyester threads (water content 0.3% by weight, individual denier ca. 3 den., $\eta_{intr.}$ 0.65) was cut with a cutting mill with a 15 mm. sieve to a mean fiber length of 8 mm. and conveyed by means of a blower into a cyclone separator mounted over a box feeder. By means of the box feeder and connected lattice, there was formed a uniform fiber fleece of 15 mm. in thickness which was then delivered to a washing machine. As a washing bath, there was used water at a temperature of ca. 50° C., to which there was added, a washing agent 0.1% by weight of a commercially available detergent. For the removal of the dust-like constituents and other impurities there were added 10 liters of fresh water per kg. of "wool." The staying time of the fleece in the washing bath amounted to 20 minutes. The washing machine used was a brief-wash machine with a squeezing (wringing) mechanism at the output, which squeezed out the major part of the water adhering to the fiber to a final water content of ca. 25% by weight. The fibers concentrated by the squeezing mechanism were again loosened up by means of a fiber opener and thereupon sent into a drier. The drying was accomplished by means of a sieve-drum drier with a hot gas temperature of 175° C. and a staying time of the fleece of 4 minutes. The final moisture of the fiber, at a relative air humidity of 60% and a temperature of 22° C., was 0.2% by weight. Thereupon, the fibers were conveyed in a supply container to a condensing or concentrating apparatus wherein by means of a blower beating the fiber fleece into small fiber clusters, the fibers were converted to a bulk weight of 0.25 kg./liter. Before the condensing process, the fibers were sprayed with a lubricant (TNPP) tris-nonyl-phenyl-phosphite in the ratio of 99.8:0.2 by weight. In a disk condenser the fiber material was condensed with lead-off of heat and thereupon by means of a cutting mill, processed into a granulate with a grain size of 3 x 3 mm. The bulk weight of the granulate was 0.58 kg./liter. The viscosity ($\eta_{intr.}$) had fallen after the condensing process by less than 0.02. The granulate was fed as regenerate into a main product stream with a proportion of 10% by means of degasing extruder. The fibers produced from this showed a tearing strength of 5.5 g./den. and a tearing stretch of 24%. The proportion of fibers showed deep-dyeing faults at 0.02%.

Example 2

Spinning wastes from endless polyester threads which were taken from a can deposit water content 20% by weight, individual denier ca. 8 den., $\eta_{intr.}$ 0.58), were cut in a cutting mill as in Example 1 to a mean fiber length of 6 mm. and conveyed by means of a blower into a cyclone separator mounted over a box feeder. By means of the box feeder and a connected lattice, there was formed a fiber fleece of 20 mm. in thickness which was supplied to a subsequent washing machine. As a washing bath, there was used water at a temperature of 60° C. to which, as above, a detergent was added. For the removal of the finishes, preparations and dust-like components there were added the necessary 15 liters of fresh water per kg. of spinning wastes. The staying time of the fleece in the washing bath was 40 minutes. The washing machine used corresponded to the apparatus of Example 1 and delivered a fleece with a water content of ca. 30% by weight. The subsequent drying was carried out as in Example 1 with the difference that here the staying time was 1.5 minutes. The final moisture of the fiber, determined at a relative atmospheric humidity of 60% and a temperature of 22° C., was 0.2%. The bulk of the fiber fleece beaten into small fiber clusters amounted to 0.19 kg./liter. The moistening, condensing and granulation took place as in Example 1. The bulk weight of the granulate was 0.56 kg./liter. The viscosity ($\eta_{intr.}$) had fallen after the condensation process by less than 0.02. The granulate was added in a proportion of 5% to a main product stream as regenerate by degasing extruder. The endless threads produced from it showed no decline in quality of any kind and were able to be further processed faultlessly.

Example 3

Staple fibers of 30 mm. polyester threads (water content 0.28% by weight, individual denier ca. 1.5 den., $\eta_{intr.}$ 0.62) were cut with a cutting mill as above with a 10 mm. sieve to a mean fiber length of 5 mm. and spread into a uniform fiber fleece of 10 mm. in thickness and delivered to a following washing machine. As a washing bath, there was used water at a temperature of ca. 55° C., to which as washing agent there had been added 0.1% by weight of commercially available detergent. To remove the finishes, preparations and dust-like constituents there were necessary 10 liters of water per kg. of fibers. The staying time of the fleece in the washing bath amounted, as in Example 2, to 40 minutes. The fleece left the squeezing mechanism with 33% by weight of final water content. After the loosening up, the fibers were dried in a sieve-drum drier with a hot gas temperature of 175° C. and a staying time of 6 minutes. The final moisture content amounted to was, as in the preceding examples 0.2% by weight. The fiber fleece beaten up into small fiber clusters was conveyed with a bulk weight of 0.10 kg./liter into the supply container of a condensing apparatus. Before the condensing process the fibers were sprayed with a lubricant (TNPP) in the ratio of 99.8:0.2% by weight. The fiber material was condensed in a disk condenser and thereupon, by means of a cutting mill worked into a granulate with a grain size of ca. 3 x 3 mm. The bulk weight of the granulate was 0.58 kg./liter. The viscosity ($\eta_{intr.}$) had fallen after the condensing process by less than 0.02. The granulate was fed with a proportion of 8% to a main product stream as regenerate by means of degasing extruder. The end product yielded staple fibers of good quality.

Example 4

The starting material was treated as in Examples 1 to 3 up to the process step "squeezing out of the water." After the washing machine, the fiber fleece was cut by means of a cutting mill with a 5 mm. sieve to a mean fiber length of 3 mm. and then immediately stored in a moist state in a silo with rabbling arm and condensed chargewise in a mixer. The condensing took place in such a way that 30 kg. of "wool," 25 kg. of spinning wastes or 15 kg. of staple fibers were placed in a hot mixer and turned under hot air of 150° C. (30 cm.²/hr.) to remove the water. After termination of the drying process (after 15 min.), vacuum was applied and the temperature slowly brought by friction of the mixing mechanism tools and jacket heating to ca. 220° C. and thereupon the fiber material was transferred into a cooling mixer, in order to prevent the decomposition of the polyester which might take place in the case of slow cooling. The grain size of the end product was 4 mm., the bulk weight 0.53 kg./liter, the viscosity loss ($\eta_{intr.}$) less than 0.02. A regenerate recovered by this process was excellently suited for the production of injection molding parts.

Examples 5, 6 and 7

The same procedure was followed as in Examples 1 to 3 with the modification that before the addition of the lubricant, there were mixed in 0.1, 0.3 and 4% respectively by weight of additives, such as titanium dioxide, lampblack, dye pigments for the promotion and generation of a matted or of a concentrate material. This material was used for the further processing entirely as feed into a main product stream for the production of fibers. The introduction of the additives was carried out in powder form with use of a dosing worm, band balance or a roller apportioner. In each case, the additive was added with the same success.

Example 8

Staple fibers of 80 mm. nylon-6 threads (wateer content 1.5% by weight, individual denier 5 den., $\eta_{rel.}$ 2.45) were cut in a cutting mill with a 10 mm. sieve to a mean fiber length of 5 mm. and spread into a uniform fiber fleece of 20 mm. in thickness and supplied to a following washing machine. As washing bath there was used water of a temperature of 60° C. to which there had been added as washing agent 0.1% by weight of a commercially available detergent. For the removal of the finishes, preparations (sizings) and dust-like components, 10 liters of water per kg. of fibers were added. The staying time of the fleece in the washing bath amounted to 40 minutes. The fleece left the squeezing mechanism with a final water content of 34% by weight. After loosening up, the fibers were dried in a sieve-drum drier with nitrogen at a temperature of 100° C. and a staying time of 15 minutes. The final moisture amounted to less than 0.5% by weight. The fiber fleece was broken up into small fiber clusters and conveyed with a bulk weight of 0.15 kg./liter into the supply container of a condensing apparatus. Before the condensing operation the fibers were sprayed with a lubricant in the ratio of 99.8:0.2% by weight. In a disk condenser, the fiber material was condensed and thereupon worked by means of a cutting mill into granulate with a grain size of ca. 3 x 3 mm. The bulk weight of the granulate was 0.57 kg./liter. The granulate was fed in proportions of 5% by weight to a main product stream as regenerate. The end product produced from it showed no perceptible decline in quality of any kind.

We claim:

1. A process for the production of regenerate from the waste product from a process for producing a synthetic high polymer fibers, said waste products comprising wool, fibers, bands or foil of a polyester or a polyamide which comprises the steps of:

(i) cutting the polyester or polyamide waste product to produce a cut waste product:
(ii) spreading the cut waste products into a fleece;
(iii) washing said fleece in a washing zone to produce a wet, washed fleece;
(iv) drying and loosening the washed fleece in a drying zone to produce a dried, loose fleece;
(v) breaking the dried, loose fleece into fiber clusters;
(vi) adding a lubricant to the fiber clusters;
(vii) condensing the lubricated fiber clusters to produce a condensed material; and
(viii) granulating the condensed material to produce a regenerate.

2. A process according to claim 1 wherein the cutting of step (i) is accomplished by cutting the waste product to a size between 1 and 15 mm. with respect to the greatest dimension and the granulate size amounts to between 2 and 6 mm.

3. A process according to claim 1 wherein the granulated regenerate is returned to a main product stream in the polymer process by means of degasing extruder.

4. A process according to claim 1 wherein with the lubricant there is added at least one additive to generate a matted condensed material, said additive added in an amount of 0.01% to 10% by weight of the waste products.

5. A process according to claim 4 wherein said additive is titanium dioxide, lampblack or a dye pigment.

6. A process according to claim 1 wherein the lubricant is 0.05% to 2.0% by weight of nonylphenyl phosphite.

7. A process according to claim 1 wherein the temperature of the washing step is between 30° C. and 80° C. and the washing step is effected with an aqueous solution containing 0.05% to 0.9% by weight washing agent.

8. A process according to claim 1 wherein the drying temperature is between 100 and 210° C. with a staying time of the fleece in the drying zone of 2 to 15 minutes.

9. A process according to claim 1 wherein the condensing process is effected under the action of high sheering forces in a disk condenser with heat withdrawal.

10. A process according to claim 1 wherein the condensing operation takes place under exclusion of oxygen.

11. A process according to claim 1 wherein said fleece is squeezed of moisture to produce a squeezed fleece prior to the drying step.

12. A process according to claim 11 wherein the squeezed fleece is loosened before the drying step.

References Cited

UNITED STATES PATENTS

| | | | |
|---|---|---|---|
| 2,550,650 | 4/1951 | Arnold | 260—2.3 |

FOREIGN PATENTS

| | | | |
|---|---|---|---|
| 1,159,624 | 12/1963 | Germany | 260—2.3 |
| 549,969 | 12/1942 | Great Britain | 260—2.3 |

WILBERT J. BRIGGS, Sr., Primary Examiner

U.S. Cl. X.R.

260—75 T, 78 S, 710, 720